Aug. 4, 1931. J. HEYWORTH ET AL 1,817,487

REED INSTRUMENT AND MORE ESPECIALLY A SAXOPHONE

Filed Aug. 20, 1928   5 Sheets-Sheet 1

Inventors
J. Heyworth;
P. J. Packman;
J. L. Nold;
by
W. E. Evans
Attorney.

Inventors
J. Heyworth:
P. J. Packman:
J. L. Mold:
by
W. E. ———
Attorney

Aug. 4, 1931.  J. HEYWORTH ET AL  1,817,487
REED INSTRUMENT AND MORE ESPECIALLY A SAXOPHONE
Filed Aug. 20, 1928  5 Sheets-Sheet 5

Inventors
J. Heyworth:
P. J. Packman:
J. L. Mold
by
W. E. Evans
Attorney.

Patented Aug. 4, 1931

1,817,487

UNITED STATES PATENT OFFICE

JOHN HEYWORTH, OF BLACKPOOL, PERCIVAL JAMES PACKMAN, OF HIGHBURY, LONDON, AND JOSEPH LESLIE MOLD, OF ACTON, LONDON, ENGLAND, ASSIGNORS OF ONE-FOURTH TO WILLIAM MANNING, OF LONDON, ENGLAND

REED INSTRUMENT AND MORE ESPECIALLY A SAXOPHONE

Application filed August 20, 1928, Serial No. 300,866, and in Great Britain March 3, 1928.

This invention relates to reed instruments, and more especially to saxophones, and has for its object to improve the quality of the notes in the upper register of the instrument.

In reed instruments such as the saxophone, clarinet, or oboe in which an octave vent is provided in a position close to the mouthpiece of the instrument and is brought into use in playing the notes of the upper register, it is found that in tuning the instrument by shifting the mouthpiece on the mouth of the tube of the instrument, the considerable variation in distance between the mouthpiece and the octave vent which results causes imperfect intonation and pitch of the notes of the upper register. This difficulty can, to some extent, be overcome by experienced players by variation of the embouchure, which procedure, however, renders more difficult the playing of the instrument, especially with respect to the notes of the upper register.

According to the invention the difficulty in such instruments is overcome by providing the octave vent to be movable longitudinally of the tube of the instrument so that when the mouthpiece is adjusted a corresponding proportional adjustment of the octave vent may be made, in accordance with the requirements and blowing of the particular player or the conditions under which the instrument is played.

According to the invention, also, those notes of the lower register which are not subject to the action of the octave vent may be adjusted in pitch to correspond with the adjustment of pitch of the notes of the higher register resulting from the use of the movable or adjustable octave vent by the use of a slotted or apertured sleeve or obturator provided for introduction into the flare or bell of the instrument and adapted to be adjusted to cover the note holes of the lower register to a greater or lesser extent as may be found necessary.

The invention may be applied in various ways. Thus, the tube of the instrument may be longitudinally slotted at the position occupied by the octave vent, and the slot may be covered by a corresponding seating for the reception of a movable cover plate carrying an octave vent and the necessary pad and lever or arm, the latter being adapted always to engage the operating lever which normally is adapted to operate the pad of the octave vent. The cover plate may be adapted to slide longitudinally upon the seating, or it may be pivoted laterally thereof and be adapted to be adjusted in position upon the seating about the said pivot. The movement of the cover plate is advantageously effected independently of the tuning movement of the mouthpiece, but means may be provided whereby the adjustment of the mouthpiece results in corresponding or proportional movement of the cover plate or slide.

The application of the invention is illustrated in the accompanying drawings, by way of example.

Figure 1:
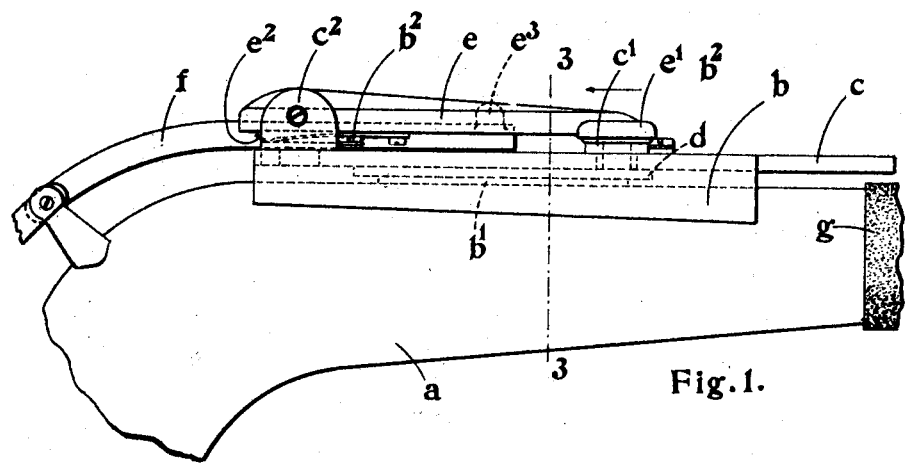
Figure 1 is an elevation of part of the crook of a saxophone, such as a melody saxophone, provided with an adjustable octave vent in accordance with the invention.
Figure 2:
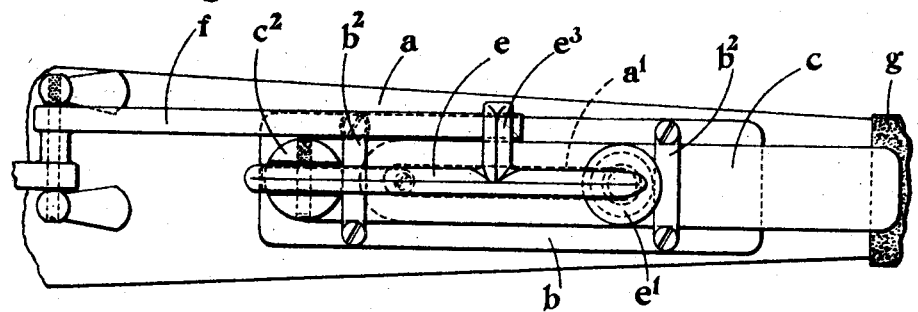
Figure 2 is a plan view corresponding to Figure 1.
Figure 3:
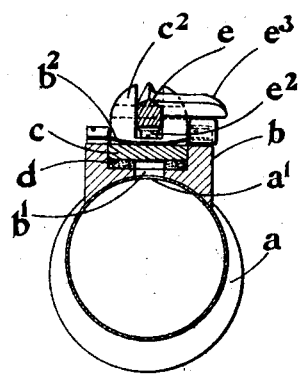
Figure 3 is a cross-section taken on the line 3—3 of Figure 1, looking in the direction of the arrow.

In carrying the invention into effect in accordance with the particular construction of movable octave vent in accordance with the invention, as represented in Figures 1 to 3 of the drawings, the crook $a$ of the instrument at the point where the upper octave vent is normally disposed is longitudinally slotted at $a^1$, for a distance of, say, an inch with a slot of a width of, for example ⅛th inch, and over the said slot there is fixedly mounted upon the instrument a suitable seating $b$, the upper surface of which is recessed for the reception of a longitudinally movable slide $c$ and is provided also with a slot $b^1$ corresponding to that in the instrument, the edges of the slot being recessed for the reception of cork or rubber packing $d$. The slide $c$ comprises a plate, of a length greater than that of the seating $b$, which is adapted to fit upon the seating and to be retained therein by a transversely disposed leaf spring or springs $b^2$, suitably secured upon the seating, as by means of screws, and adapted to bear upon the slide $c$ in such manner as to press it upon the packing. At a suitable position the slide is formed with a hole to receive the nipple $c^1$ forming the octave vent, while at one end it is similarly provided to receive a pivot block $c^2$ for the reception of the pivot of the arm $e$ adapted to carry the vent pad $e^1$. The arm $e$ is provided to extend along the slide $c$ and upon its underside is fitted a leaf spring $e^2$ which bears upon the slide $c$ and tends always to maintain the pad $e^1$ in the closed position.

The existing lever $f$ of the pad of the octave vent is diverted laterally and carried alongside the slide $c$ in such manner that its forward end may engage below a laterally projecting arm $e^3$ provided upon the arm $e$, so that upon the operation of the said lever $f$ the arm $e^3$ engaging it is raised and thereby the arm $e$ carrying the pad is lifted against the pressure of the leaf spring $e^2$. By such a construction, when the mouthpiece indicated at $g$ is adjusted for tuning the instrument the slide $c$ may be correspondingly moved for the adjustment of the position of the octave vent $c^1$ without deranging the engagement of the lever $f$ and the arm $e$ carrying the pad. Thus, when the mouthpiece is moved, for example, inwardly from a position in which the instrument is out of pitch and is caused to approach the octave vent, the notes from, for example, A upwards in the upper register become sharp. For the purpose of correcting this defect the slide $c$ is moved until the true intonation or pitch is secured.

Figure 4:
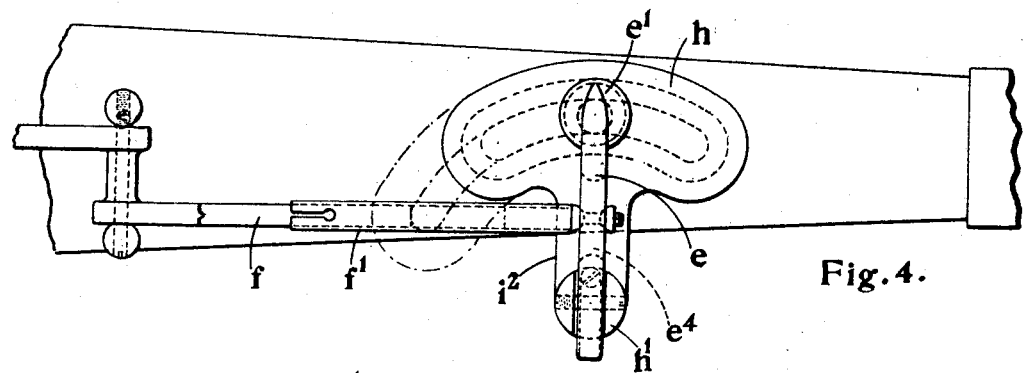
Figure 4 is a plan view of a modified construction of the adjustable octave vent.
Figure 5:
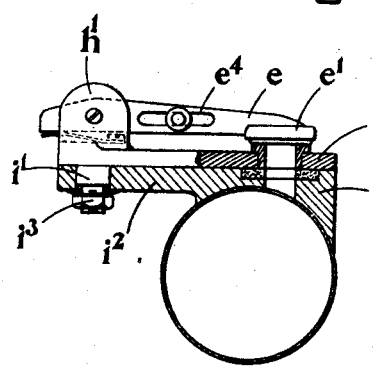
Figure 5 is a cross-sectional view corresponding to Figure 4.

In the construction illustrated in Figures 4 and 5, the slide $h$ is of arc shape and is pivoted at $i^1$ upon an arm $i^2$ of the seating $i$ of a shape corresponding to the slide $h$. The arm $e$ with the vent pad $e^1$ is pivoted as before in a pivot block $h^1$. The slide $h$ is adapted to be adjusted upon the seating $i$ and to be secured in position by means of a locking nut $i^3$. The operating lever $f$ is provided with a telescoping portion $f^1$ suitably formed to engage a slot $e^4$ in the arm $e$.

Figure 6:
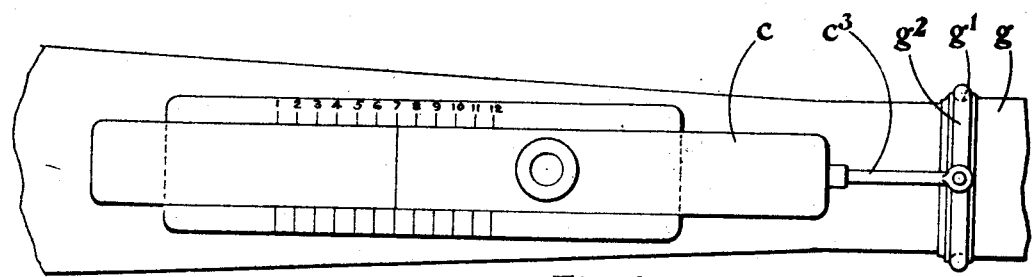
Figure 6 is a diagrammatic plan view in illustration of a construction of the adjustable octave vent in which the vent slide is moved directly by the mouthpiece.

In Figure 6 the slide $c$, as in the construction of Figures 1-3, is provided to be moved directly from the mouthpiece $g$. For this purpose the mouthpiece is provided with an annular groove $g^1$ in which is rotatably disposed a ring $g^2$ with which is pivotally connected a rod $c^3$ extending from the slide $c$. This figure also illustrates the graduation of the seating and the slide in order that the adjustment of position of the slide may be observed. Such a method of graduation may be applied in any of the constructions in accordance with the invention.

Figure 7:
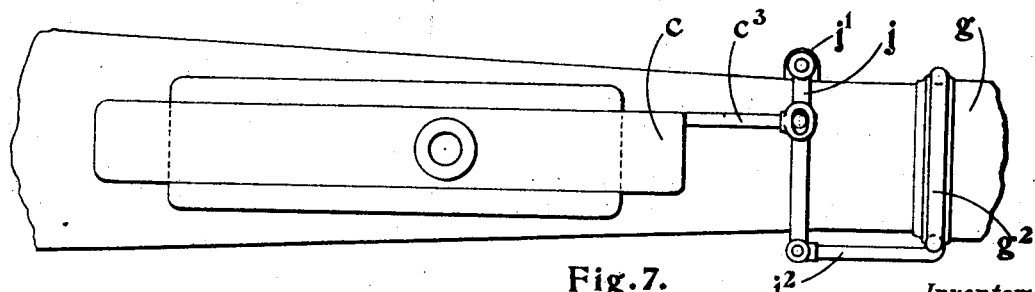
Figure 7 is a view similar to Figure 6 illustrating mechanism whereby the slide is given a movement proportional to the movement of the mouthpiece.

Figure 7, which illustrates a construction substantially similar to that shown in Figure 6, shows a modification in which the rod $c^3$ is pivotally engaged with a lever $j$ pivoted upon a bracket or support $j^1$ and linked to the ring $g^2$ by means of a link $j^2$. By such a construction the movement of the slide $c$ is made proportional to the movement of the mouthpiece $g$.

Figure 8:
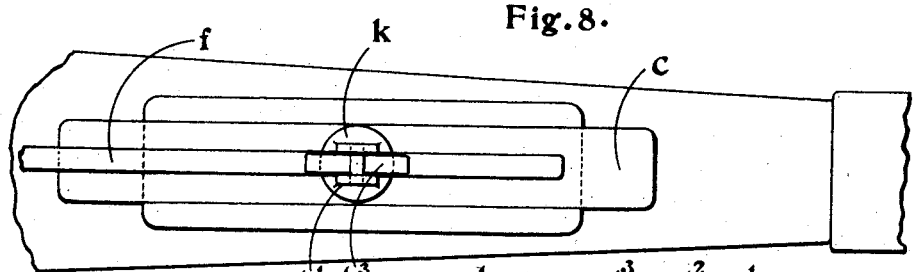
Figure 8 is a plan view illustrating a construction of the adjustable vent in which the original octave vent operating lever is employed.
Figures 9, 10:
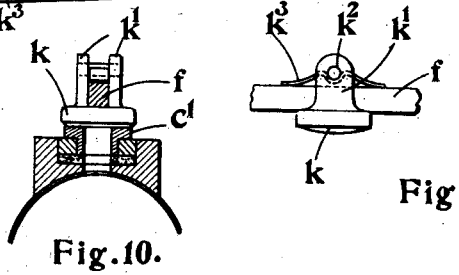
Figure 9 is a detail elevation corresponding to Figure 8.
Figure 10 is a cross-sectional elevation corresponding to Figure 8.

In the construction represented in Figures 8 to 10, the operating lever or arm $f$ serving for the operation of the octave vent pad may be the original operating lever or a lever similarly mounted, and in order to permit the adjustment of position of the octave vent, the slide $c$ is provided as before to carry an adjustable vent nipple $c^1$ and is closed by a pad $k$ having lugs $k^1$ to embrace the lever or arm $f$, the lugs being connected by a pin $k^2$ which serves also to retain a spring $k^3$ by which the adjusted position of the pad $k$ may be maintained. In such a construction it will be observed that the pad may be moved along the length of the arm $f$ in accordance with the adjustment given to the cover plate or slide $c$.

Figure 11:
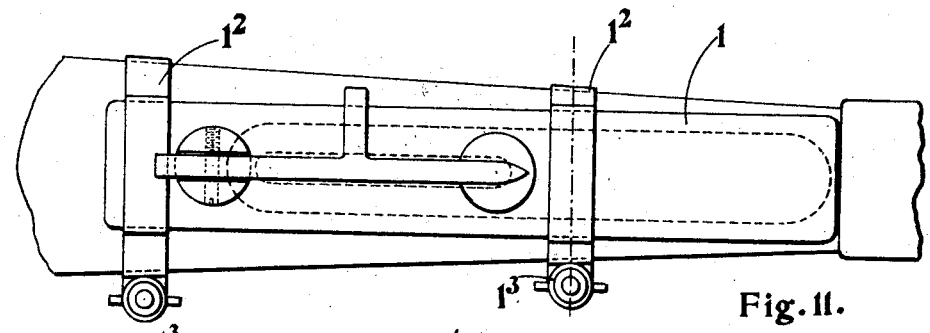
Figure 11 is a plan view of a construction in which a movable seating carrying the octave vent is adapted to be adjusted on the crook.
Figure 12:
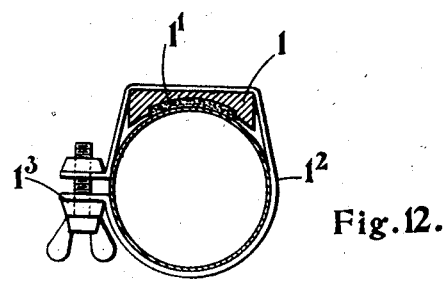
Figure 12 is a cross-section corresponding to Figure 11.

In order to reduce the number of parts and to render unnecessary the provision of a movable cover plate or slide, as illustrated in Figures 11 and 12, the seating $l$ may be provided to carry the octave vent and the pivot block, together with the operating arm and pad, and may seat directly upon the crook over the longitudinal slot and may be adjusted longitudinally thereon for the adjustment of position of the octave vent. The underface of the seating $l$ is packed with a soft rubber or like packing block $l^1$ through which the vent nipple extends. Such seating may be secured in the adjusted position upon the crook by means of ligatures $l^2$ secured by adjusting screws $l^3$. Any other suitable means, however, may be provided whereby the seating may be alternately released for adjustment of the octave vent and secured in position after adjustment.

Figure 13:
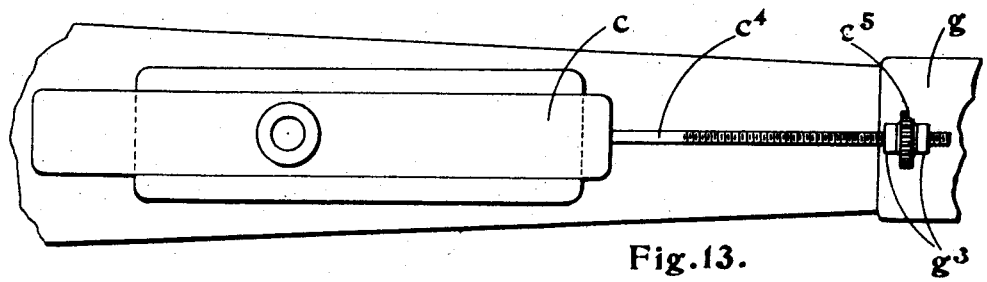
Figure 13 is a diagrammatic plan view in illustration of a construction in which the vent slide is moved from the mouthpiece.

Figure 13 illustrates a construction in which the cover plate or slide $c$ is adapted to be adjusted directly by the movement of the mouthpiece $g$ and also to be capable of fine adjustment relatively thereto. For this purpose a screw-threaded rod $c^4$ extends rearwardly from the slide $c$ to the mouthpiece $g$ where it passes through two lugs $g^3$ provided upon the mouthpiece and is engaged by an adjusting nut $c^5$ disposed between the said lugs $g^3$. Thus, the movement of the mouthpiece results in corresponding movement of the slide $c$, while further adjustment of the slide may be effected by the rotation of the nut $c^5$. It will be understood that a reverse arrangement of these parts may be adopted and also that the adjustment of the slide $c$ may be effected in a similar manner with reference to the crook of the instrument and independently of the mouthpiece $g$.

The tube of the instrument, the seating or the cover plate or slide may be provided with graduations or indications defining the requisite positions of the vent hole in relation to the corresponding pad of the instrument, as determined by the adjustment of the mouthpiece, so that the adjustment of the vent may be effected in accordance with a particular indication or mark. A form of graduation is indicated in Figure 6.

It will be observed that in any construction in accordance with the invention, the seating, cover plate or slide may have the octave vent nipple so mounted thereon as to permit the substitution of other vent nipples which may have bores of different diameters.

The contacting surfaces of the seating and the tube of the instrument or of the seating and the cover plate or slide may be packed with suitable material such as cork or rubber, and such packing may be adapted to be received into suitable recesses or seatings in such manner that it may be readily replaced.

Figure 16:
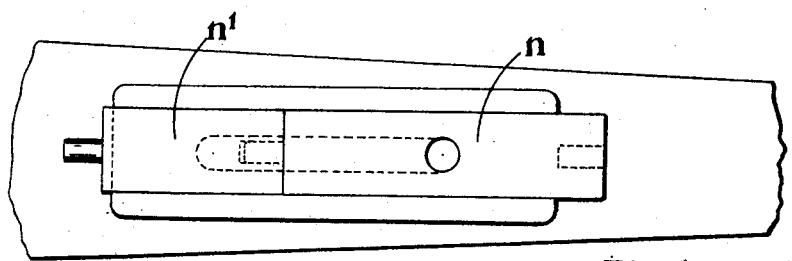
Figure 16 is a diagrammatic plan view of a construction in which the vent slide is provided in parts.
Figure 17:
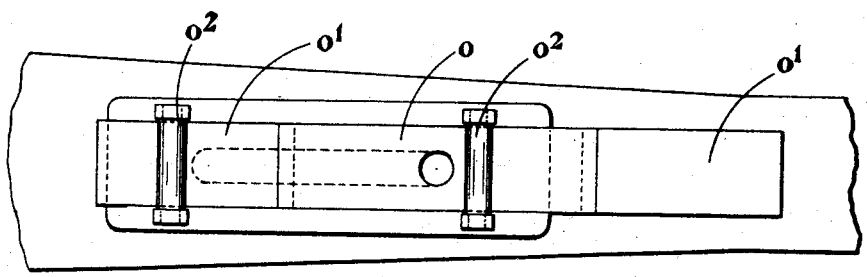
Figure 17 is a diagmmatic plan view of a construction in which the vent slide is provided with resilient or elastic extensions.
Figure 14:
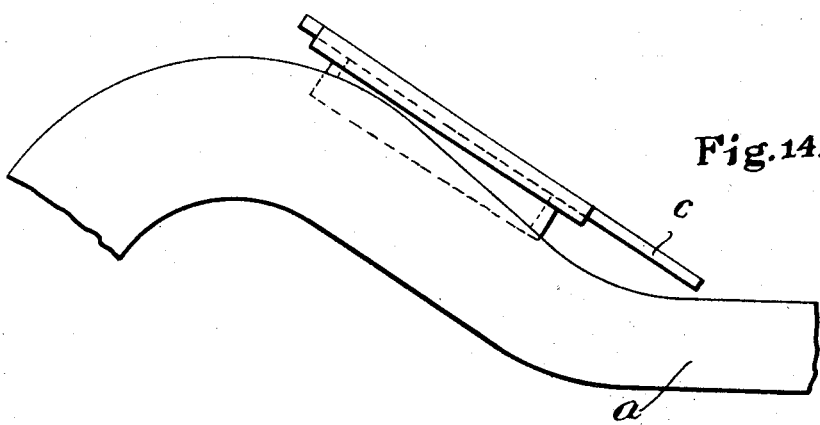
Figure 14 is a view in elevation illustrative of a construction of vent slide seating for use upon the crook of a tenor saxophone.
Figure 15:
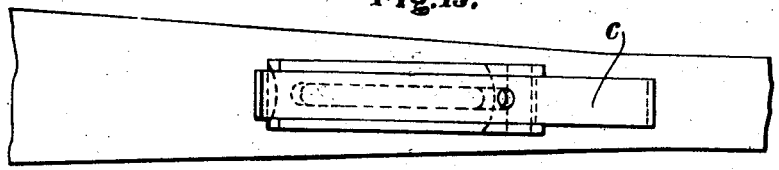
Figure 15 is a corresponding plan view.

Again, in the case of the application of the invention to the octave vent adjacent the mouthpiece in instruments such as the tenor saxophone having a curved crook, it may be desirable to design the seating, the cover plate or the slide in such manner as to permit the adjustment of the position of the vent hole without difficulty, notwithstanding the curved form of the said crook. Thus, as illustrated in Figures 14 and 15, the seating may be provided so that in elevation it is substantially of wedge shape and so that when the slide or cover plate $c$ carrying the vent hole is moved towards the mouthpiece it does not foul the curve of the crook $a$ adjacent the mouthpiece. In such a construction the interior of the seating may be hollowed out so that the seating is of uniform thickness immediately below the slide or cover plate. The seating may be fitted in a slot made in the crook and may be secured in position thereon at the desired angle of inclination. Again, the seating may be disposed laterally of the crook so that the possibility of the slide or cover plate fouling the tube of the instrument does not arise. Where such a construction is applied to an existing saxophone, the original octave vent will require to be sealed. Again, where the seating is not provided of wedge shape, a slide or cover plate (Figure 16) may be provided which is in two or three parts, one of which $n$ serves to carry the vent hole. Thus, when the vent hole has been moved a certain distance towards the mouthpiece, the portion of the slide $n^1$ projecting from the seating may be removed and inserted at the rear side of the vent hole, a pin and slot or like method of connection being adopted to attach the parts of the slide together. A further modified construction may comprise the vent hole mounted upon a short carrier $o$ adapted to slide upon the seating (Figure 17) the said carrier being provided with extensions $o^1$ in both directions, formed of rubber or like flexible material and adapted to extend along the seating and to be carried under pressure rollers $o^2$ disposed respectively at each end of the seating. Thus, when the vent hole is moved in either direction along the seating, the extension of rubber or like flexible material will project outwardly therefrom and may contact without difficulty with the adjacent portion of the tube of the instrument. It is, however, only essential that the flexible extension should be provided on that side of the vent hole which in the movement of the adjustment of the vent hole approaches the tube of the instrument.

In this construction of the adjustable octave vent, or, in fact, in any one of the modifications hereinbefore described, the operating lever by which the arm of the vent pad is operated may be provided to be telescopic by the provision of a movable or slidable end portion adapted to move relatively to the main body of the lever, and if necessary to be secured in any desired position of adjustment.

Figure 18:
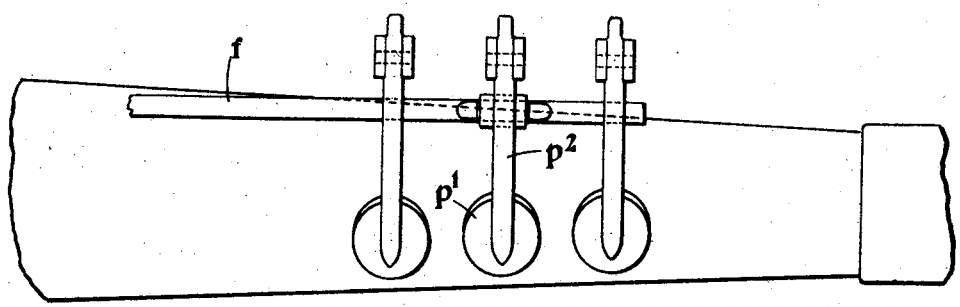
Figure 18 is a plan view in illustration of a modified construction in which a number of octave vents and pads are provided for selective operation from the operating lever of the instrument.
Figure 19:
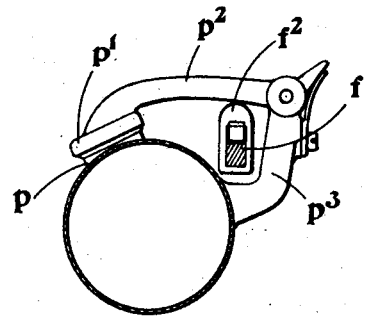
Figure 19 is a cross-section corresponding to Figure 18.

Figures 18 and 19 illustrate a modified arrangement of adjustable vent in which a series of vent nipples $p$ are provided upon the crook of the instrument and each nipple is closed by a corresponding pad $p^1$ carried by an arm $p^2$ pivoted to a corresponding bracket $p^3$ or common bracket member also secured to the crook of the instrument. In such a construction the operating lever $f$ is provided with a slidable knob or projection $f^2$ mounted thereon after the manner of the adjustable pad $k$ in the construction represented in Figures 8 to 10. Thus, according to the vent nipple to be employed the knob or projection $f^2$ is adjusted in position along the lever $f$ so that it is disposed immediately below the arm $p^2$ of the said vent.

Figure 20:
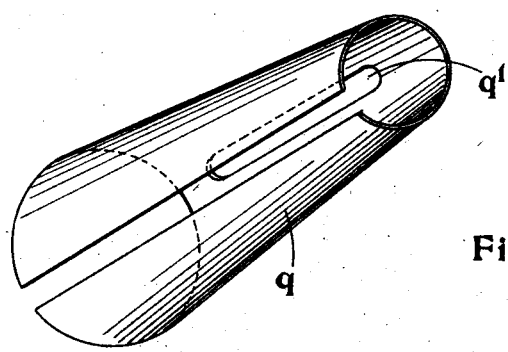
Figure 20 is a perspective view of a sleeve suitable for use in the flare or bell of the instrument with respect to the note holes of the lower register.

In order that the notes of the lower register of the instrument that are not affected by the adjustment of the octave vent may be maintained in the corresponding pitch, it is found desirable to introduce into the mouth or bell of the instrument a sleeve or obturator, which in one position will leave the note holes in question fully open but which, when adjusted in position, is adapted to reduce to a greater or lesser extent the areas of the said note holes. As illustrated in Figure 20 a sleeve $q$ of fibre or like material of a shape and diameter such as to fit firmly and elestically within the instrument may be provided, and such sleeve may be slotted longitudinally as at $q^1$ in such manner that the said slot may be brought into coincidence with the note holes that are to be controlled. The slot $q^1$ may be of any desired width as the extent of opening of the note holes may be determined by moving one of the lateral edges of the slot across the areas of the note holes. The slot may obviously be replaced by openings corresponding to each of the note holes, or alternatively the sleeve may be without a slot or openings, and the desired effect may be secured by adjusting one of the longitudinal edges of the sleeve across the note holes in question. Similarly, the sleeve may be replaced merely by a length or strip of material of a length and width sufficient to cover the said note holes, the said length or strip of material being provided with two or more narrow sleeves or rings split to give elasticity and serving to fit into the mouth or bell portion of the instrument, after the manner of the sleeve $q$ and thus to maintain the length or strip of material in its adjusted position.

It will be understood that the invention is not limited to any particular manner in which the adjustment of position of the octave vent is effected, and although the invention is especially applicable to the octave vent which is disposed adjacent the mouthpiece of the instrument and which is therefore the cause of imperfect intonation upon adjustment of the mouthpiece, it is also applicable with the advantage to the lower octave vent. In such an application the same methods of effecting the adjustment of the octave vent may be applied as are hereinbefore described.

We claim:

1. Reed instruments, more especially saxophones, provided with an octave vent adjacent the mouthpiece, and means for determining the position of the octave vent in use, while permitting its control by the usual octave vent mechanism substantially as hereinbefore described.

2. Reed instruments, more especially saxophones, provided with an octave vent that may be adjusted in position longitudinally along the instrument, while permitting its control by the usual octave vent mechanism substantially as hereinbefore described.

3. Reed instruments, more especially saxophones, provided with a plurality of octave vents in adjusted positions, and means for the selection of any one of the plurality of octave vents, while permitting its control by the usual octave vent mechanism substantially as hereinbefore described.

4. Reed instruments, more especially saxophones, provided with a slotted seating, a vented cover plate upon the said seating, a pad for closing the vent of the cover plate, means for operating the said pad from the usual octave vent mechanism, and means for effecting adjustment of the cover plate upon the instrument, substantially as hereinbefore described.

5. Reed instruments, more especially saxophones, provided with a slotted seating, a vented cover plate applied upon the said seating, a pad closing the vent of the cover plate, an operating arm for the said pad supported upon the said cover plate, an operating lever pivotally mounted upon the instrument and corrsponding to the usual octave vent lever, and means for engaging the said lever with the arm of the pad, substantially as hereinbefore described.

6. Reed instruments, more especially saxophones, provided with an octave vent and pad adjustable in position upon the instrument, and means for effecting the adjustment of the said vent and pad from the mouthpiece of the instrument, substantially as hereinbefore described.

7. In reed instruments, more especially saxophones, an adjustable octave vent and pad therefor, with operating mechanism, and an adjusting link connecting the said adjustable vent pad and mechanism with the mouthpiece of the instrument, substantially as hereinbefore described.

8. In reed instruments, more especially saxophones, an adjustable octave vent, pad and operating mechanism therefor, and means connecting the said adjustable elements with the mouthpiece of the instrument so that movement of the mouthpiece results in proportional movement of the octave vent pad and mechanism therefor, substantially as hereinbefore described.

9. In reed instruments, more especially saxophones, an adjustable octave vent, pad and mechanism therefor, a lever pivoted upon the instrument, a link connecting the said lever with the adjustable vent, pad and mechanism therefor, and a link connecting the said lever with the mouthpiece of the instrument, substantially as hereinbefore described.

10. In reed instruments, more especially saxophones, an octave vent adjustable upon the said instrument, a pad operating lever pivoted upon the said instrument, said lever corresponding to the usual octave vent lever and a vent pad adjustable upon the said lever, substantially as hereinbefore described.

11. In reed instruments, more especially saxophones, a vent seating removably mounted upon the said instrument and adapted for adjustment longitudinally thereon, an octave vent provided upon the said seating, a pad and operating mechanism for the said vent corresponding to the usual octave vent pad and operating mechanism, and means for securing the said seating upon the instrument in a desired position of adjustment, substantially as hereinbefore described.

12. In reed instruments, more especially saxophones, an octave vent adjustable upon the instrument, a pad and operating mechanism therefor, a screwed spindle and an adjusting nut, whereby adjustment of the octave vent, the pad and the mechanism therefor, may be effected relatively to the instrument, substantially as hereinbefore described.

13. In reed instruments, more especially saxophones, an adjustable octave vent, pad and mechanism therefor, a screwed spindle connected with the said octave vent, pad and mechanism therefor, fixed abutments upon a part of the instrument, the said abutments being engaged by the said spindle and an adjusting nut upon the said spindle disposed between the said abutments, substantially as hereinbefore described.

14. Reed instruments, more especially saxophones, provided with an adjustable octave vent, a slide upon which the said octave vent is disposed, and means for closing the said octave vent, the said slide being provided in detachable parts, substantially as hereinbefore described.

15. Reed instruments, more especially saxophones, provided with an adjustable slide, an octave vent upon the said slide and closing mechanism therefor, the said slide being provided with resilient extensions and pressure rollers adapted to engage said resilient extensions, substantially as hereinbefore described.

16. Reed instruments, more especially saxophones, provided with an adjustable octave vent and closing mechanism therefor, and a removable sleeve adjustable within the mouth portion of the instrument with an obturating edge for the partial closure of each of the note holes of the lower register, substantially as hereinbefore described.

17. In reed instruments, more especially saxophones, provided with an adjustable octave vent and closing mechanism therefor, the provision of an adjustable obturator within the mouth portion of the instrument with an obturating edge for controlling the area of each of the note holes of the lower register, substantially as hereinbefore described.

JOHN HEYWORTH.
PERCIVAL JAMES PACKMAN.
JOSEPH LESLIE MOLD.